US012638894B2

(12) United States Patent
Beaudin et al.

(10) Patent No.: US 12,638,894 B2
(45) Date of Patent: May 26, 2026

(54) CENTRALIZED INTELLIGENT POWER MANAGEMENT

(71) Applicant: HEWLETT PACKARD ENTERPRISE DEVELOPMENT LP, Spring, TX (US)

(72) Inventors: Andre Beaudin, St. Laurent (CA); Frederic Mouveaux, St. Laurent (CA); Omar El Ferkouss, St. Laurent (CA); Stephane Laroche, St. Laurent (CA); Mathieu Mercier, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 66 days.

(21) Appl. No.: 18/493,384

(22) Filed: Oct. 24, 2023

(65) Prior Publication Data

US 2025/0130617 A1     Apr. 24, 2025

(51) Int. Cl.
G06F 1/26          (2006.01)
G06F 1/3287        (2019.01)
(Continued)

(52) U.S. Cl.
CPC ........... G06F 1/266 (2013.01); G06F 1/3287 (2013.01); H02J 50/20 (2016.02); H04B 10/807 (2013.01);
(Continued)

(58) Field of Classification Search
CPC ........ G06F 1/266; G06F 1/3287; H02J 50/20; H04B 10/807; H04L 12/10; H04L 41/0803; H04W 52/06; H04W 52/386
See application file for complete search history.

(56) References Cited

U.S. PATENT DOCUMENTS

| | | | | |
|---|---|---|---|---|
| 11,522,727 | B2 * | 12/2022 | Ernohazy | .......... H04L 12/40045 |
| 11,669,151 | B1 * | 6/2023 | Messick | ................ G06F 1/3206 |
| | | | | 713/323 |
| 2005/0272402 | A1 * | 12/2005 | Ferentz | ................... H04L 12/10 |
| | | | | 713/320 |

(Continued)

FOREIGN PATENT DOCUMENTS

| | | | | | |
|---|---|---|---|---|---|
| EP | 0868093 | A1 * | 9/1998 | .......... | H04W 52/343 |
| JP | 2011198288 | A * | 10/2011 | | |

OTHER PUBLICATIONS

Beloglazov et al., "Energy-aware resource allocation heuristics for efficient management of data centers for Cloud computing", May 4, 2011, Future Generation Computer Systems, SciVerse Science Direct, pp. 755-767 (Year: 2011).*

(Continued)

*Primary Examiner* — Rehana Perveen
(74) *Attorney, Agent, or Firm* — Sheppard Mullin Richter & Hampton LLP

(57)          ABSTRACT

Systems and methods are provided for effectuating centralized intelligent power management, where a centralized intelligent power management system receives power delivery information from power sources and power management profiles associated with devices that receive/are to receive power from such power sources. The centralized intelligent power management system can determine a given feature set support by a device, yet remains within the power delivery budget of a power source. Such a feature set can be represented as a configuration that is transmitted from the centralized intelligent power management system to a device. Upon configuring/re-configuring itself, the device may now provide the given feature set while remaining within the power constraints of its power source.

20 Claims, 6 Drawing Sheets

(51) Int. Cl.

| | |
|---|---|
| *H02J 50/20* | (2016.01) |
| *H04B 10/80* | (2013.01) |
| *H04L 12/10* | (2006.01) |
| *H04L 41/0803* | (2022.01) |
| *H04W 52/06* | (2009.01) |
| *H04W 52/38* | (2009.01) |

(52) U.S. Cl.

CPC .......... *H04L 12/10* (2013.01); *H04L 41/0803* (2013.01); *H04W 52/06* (2013.01); *H04W 52/386* (2013.01)

(56) References Cited

U.S. PATENT DOCUMENTS

| | | | | |
|---|---|---|---|---|
| 2006/0053324 | A1* | 3/2006 | Giat ......................... | H04L 12/10 |
| | | | | 713/300 |
| 2007/0110360 | A1* | 5/2007 | Stanford ............. | H04L 41/0803 |
| | | | | 385/14 |
| 2010/0083022 | A1* | 4/2010 | Diab ................. | H04L 12/40045 |
| | | | | 713/340 |
| 2010/0211806 | A1* | 8/2010 | Diab ....................... | G06F 1/266 |
| | | | | 713/310 |
| 2014/0245031 | A1* | 8/2014 | Hamdi .............. | H04L 12/40045 |
| | | | | 713/300 |
| 2015/0160708 | A1* | 6/2015 | Mukherjee .............. | G06F 1/206 |
| | | | | 713/340 |
| 2016/0360362 | A1* | 12/2016 | Do ......................... | H04W 4/023 |
| 2017/0139465 | A1* | 5/2017 | Badam .................... | G06F 1/329 |
| 2020/0076628 | A1* | 3/2020 | Yam .................... | H04L 43/0817 |
| 2023/0415684 | A1* | 12/2023 | Ikeda ..................... | B60R 16/03 |

OTHER PUBLICATIONS

Kevin Kilbane, "Understanding the IEEE 802.3bt PoE Standard", 2022, 9 pages.

Morty Eisen, "Introduction to PoE and the IEEE802.3af and 802.3at Standards", Sep. 29, 2010, 42 pages.

* cited by examiner

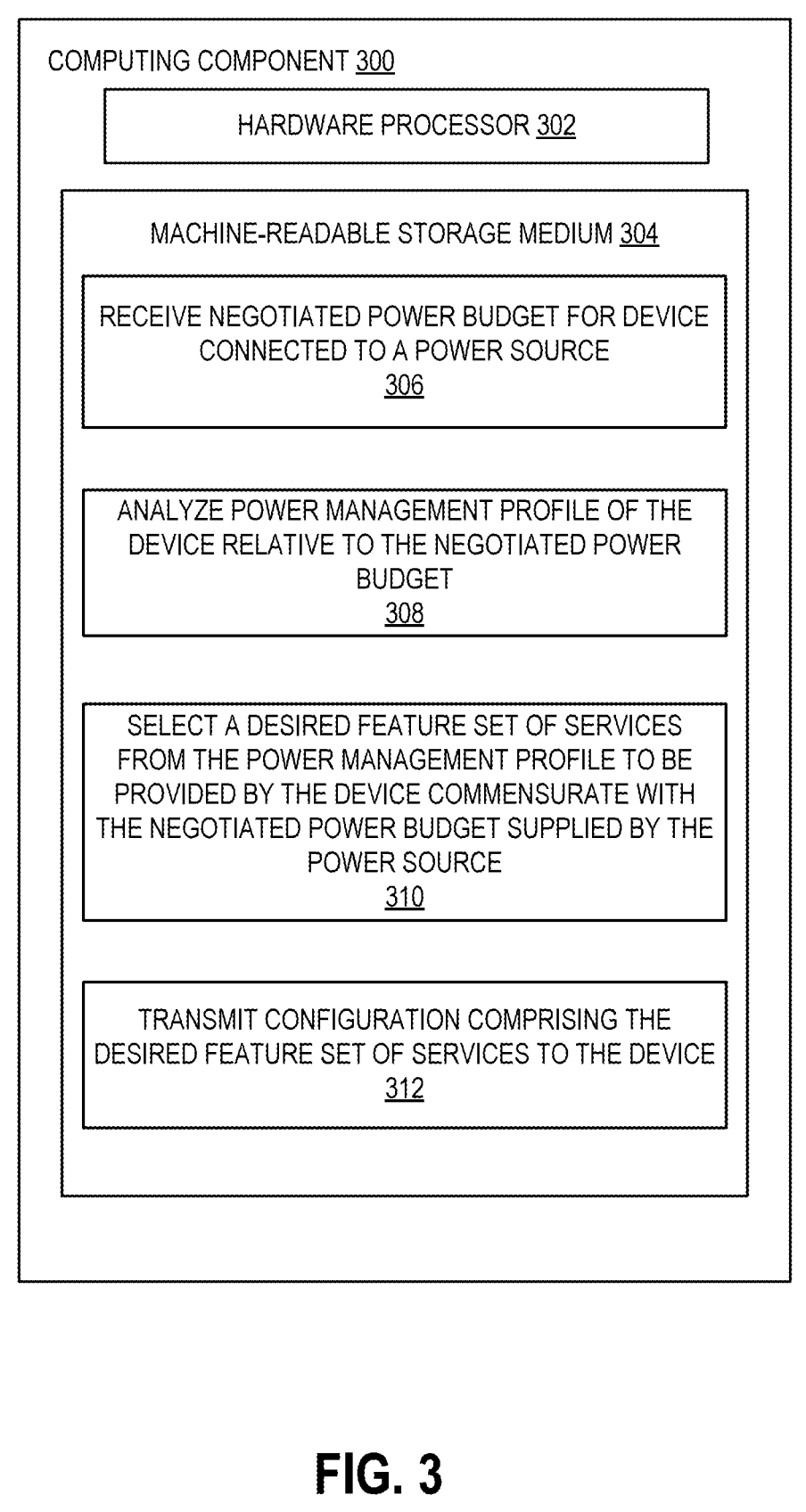

COMPUTING COMPONENT 300

HARDWARE PROCESSOR 302

MACHINE-READABLE STORAGE MEDIUM 304

RECEIVE NEGOTIATED POWER BUDGET FOR DEVICE CONNECTED TO A POWER SOURCE
306

ANALYZE POWER MANAGEMENT PROFILE OF THE DEVICE RELATIVE TO THE NEGOTIATED POWER BUDGET
308

SELECT A DESIRED FEATURE SET OF SERVICES FROM THE POWER MANAGEMENT PROFILE TO BE PROVIDED BY THE DEVICE COMMENSURATE WITH THE NEGOTIATED POWER BUDGET SUPPLIED BY THE POWER SOURCE
310

TRANSMIT CONFIGURATION COMPRISING THE DESIRED FEATURE SET OF SERVICES TO THE DEVICE
312

FIG. 3

CENTRALIZED INTELLIGENT POWER MANAGEMENT

BACKGROUND

Electronic devices are typically associated with a specific power budget in order to properly function. Such electronic devices can be connected to a direct power source, e.g., a power adapter that ultimately connects to a building mains or similar originating power source. In the context of networks, some network devices may connect to a network Power-over-Ethernet (POE) source. An example of such a PoE source is a network switch, which can negotiate power delivery/budgeting with such network devices based on PoE standards, (such as IEEE 802.3af, .3at, .3bt) and the network devices' respective power class levels.

BRIEF DESCRIPTION OF THE DRAWINGS

The present disclosure, in accordance with one or more various examples, is described in detail with reference to the following figures. The figures are provided for purposes of illustration only and merely depict typical examples.

FIG. 3 is an example computing component that may be used to implement centralized IPM in accordance with one example of the disclosed technology.

Figure 1A:
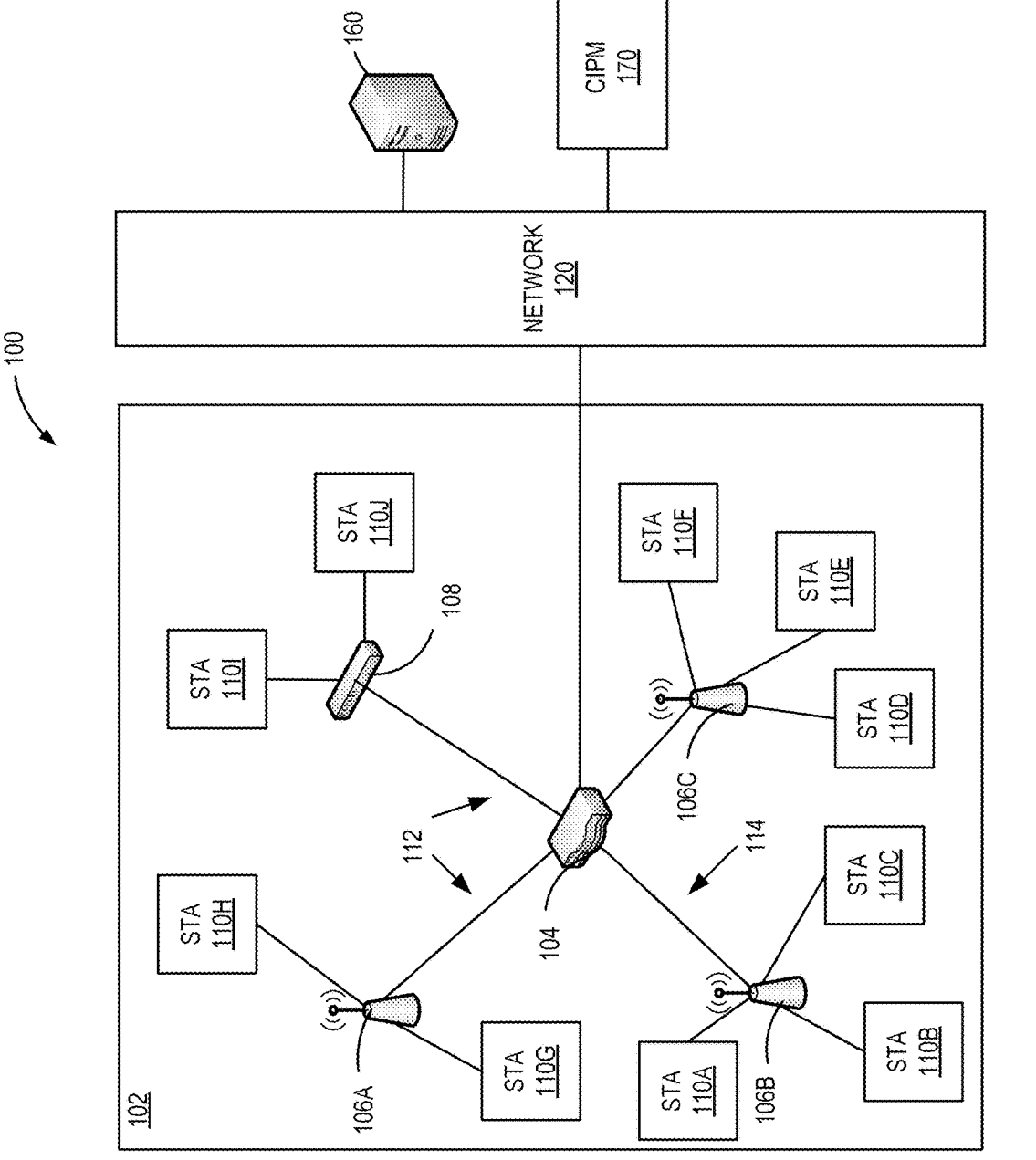
FIG. 1A illustrates one example of a network configuration in which centralized intelligent power management (IPM) may be implemented.

The figures are not exhaustive and do not limit the present disclosure to the precise form disclosed.

DETAILED DESCRIPTION

As noted above, electronic devices tend to operate better when they are in receipt of power commensurate with or that meets their specific power budget. Typically, this is not an issue when an electronic device is operatively connected to a direct power source. However, in the context of networks, where, as also alluded to above, electronic devices may receive power from a network PoE source, such network PoE sources are typically limited or fixed with respect to the amount of power that they can deliver. In other words, the total power budget or capacity of a network PoE source, such as a network switch, while fixed, often delivers power to multiple power-requesting network devices with varying power budgets. Accordingly, scenarios can arise where a PoE source cannot provide the power requested by one or more such network devices because the power that the PoE source is capable of providing or is allowed to provide, cannot meet the specific power budget(s) of the network device(s) to which it is connected/servicing. For example, a network device, such as an access point (AP) may not be able to provide all the services/functions for which it is configured unless it receives the power it needs (according to its power budget). It should be noted that although examples of the disclosed technology may be described in the context of power delivery via PoE mechanisms, other power delivery mechanisms or schemes may be used as appropriate, such as Power-over-fiber (PoF), Power-over-Wi-Fi (PoWiFi).

Intelligent Power Management (IPM) can refer to a feature or functionality that actively measures the power utilization of a device, such as a network device, and that can adjust the operating characteristics of a device (e.g., adjusting device resources, adjusting feature set, etc.) to fit or stay within the power budget that is available from the PoE source to which the device is operatively connected. For example, instead of shutting down or entirely disabling a network device when its specific power budget needs cannot be met, its operating characteristics can be modified to allow its continued operation. For example, IPM may involve continuously monitoring the available power (from a PoE source) consumed by the network device versus the network devices' given (default) power budget. In this way, IPM can be used to adjust a device's resources in order to optimize or maximize device operation while keeping the power draw of the device within the available power budget.

Unfortunately, incorporating IPM components or functionality into network devices can increase their footprint, as well as their cost. As a result, some network devices may not have native IPM functionality, thereby losing the ability to adjust power budget.

In order to retain IPM functionality in systems or networks in which non-resident-IPM devices operate, a centralized IPM system is provided in accordance with examples of the disclosed technology. The centralized IPM system may collect power information from switches that act as power sources, as well as host power management profiles for devices under its management. Rather than a resident IPM component of a network device assessing power budget changes of that network device, the centralized IPM system can react to such power budget changes. In this way, the centralized IPM system can adjust the functionality of a network device based on network power source information and the network device's power management profile.

To the above, power management profiles may comprise a list of features or feature-combinations (also referred to as a feature set) that impact or otherwise affect the power consumption of a network device, as well as the power requirements associated with each such feature/combination of features. In some instances, a priority associated with a feature or feature set can also be reflected in a power management profile, the priority of importance being based on the different classes of power sources. In some cases, power management profiles are generated prior to releasing a network device to market, and in some cases, power management profiles are regularly updated/updated as—desired. This is done to ensure that the power management profile of a network device considers not only the network device's hardware characteristics, but also the software features/functionalities that are supported by the network device (which can change over time vis-à-vis software updates, for example). For example, a network device manufacturer may distribute power management profiles associated with that network device manufacturer's network devices, e.g., by model, by type, or by one or more other network device characteristics.

The centralized IPM system can be provided with the aforementioned power management profiles, and an algorithm can be used to select an appropriate, e.g., mostappropriate, feature or feature set of a network device. The selected feature/feature set can be based on the model (or other representative aspect or identifier) of a network device and the negotiated power. A variety of algorithms can be used for this purpose, e.g., a more simple, priority-assigned mechanism, where, for example, a negotiated power budget is set to be applied to the highest-priority features of a network device. That is, lower-priority features/feature sets may not be made available, or may be designated as being currently unsupported by the network device. Another algorithm that may be used is an intelligent algorithm that may achieve better optimization. In either case, a determined feature set for a network device can be relayed back to the network device so that network device can adjust its operation (or operating configuration) accordingly.

FIG. 1A illustrates one example of a network configuration 100 that may be implemented for an organization, such as a business, educational institution, governmental entity, healthcare facility or other organization, in which examples of the disclosed technology may be implemented and utilized. This diagram illustrates an example of a configuration implemented with an organization having multiple users (or at least multiple client devices 110) and possibly physical or geographical sites, such as site 102. The network configuration 100 may include site 102 in communication with a network 120. The network configuration 100 may also include one or more remote sites (not shown).

The site 102 may include a network, which can be, for example, an office network, home network or other network installation. The site 102 network may be a private network, such as a network that may include security and access controls to restrict access to authorized users of the private network. Authorized users may include, for example, employees of a company at site 102, residents of a house, customers at a business, and so on.

In the illustrated example, the site 102 includes a controller 104 in communication with the network 120. The controller 104 may provide communication with the network 120 for the site 102, though it may not be the only point of communication with the network 120 for the site 102. A single controller 104 is illustrated, though the site 102 may include multiple controllers and/or multiple communication points with network 120. In some embodiments, the controller 104 communicates with the network 120 through a router (not illustrated). In other embodiments, the controller 104 provides router functionality to the devices in the site 102.

A controller 104 may be operable to configure and manage network devices, such as at the site 102. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106A-C provide network connectivity to various client devices 110A-J. Using a connection to a switch 108 or AP 106A-C, a client device 110A-J may access network resources, including other devices on the (primary site 102) network and the network 120.

Examples of client devices may include, but are not limited to the following: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IoT) devices, and the like.

Within site 102, a switch 108 is included as one example of a point of access to the network established in primary site 102 for wired client devices 110i-j. Client devices 110I-J may connect to the switch 108 and through the switch 108, may be able to access other devices within the network configuration 100. The client devices 110I-J may also be able to access the network 120, through the switch 108. The client devices 110I-J may communicate with the switch 108 over a wired 112 connection. In the illustrated example, the switch 108 communicates with the controller 104 over a wired 112 connection, though this connection may also be wireless.

Wireless APs 106A-C are included as another example of a point of access to the network established in primary site 102 for client devices 110A-H. Each of APs 106a-c may be a combination of hardware, software, and/or firmware that is configured to provide wireless network connectivity to wireless client devices 110A-H. In the illustrated example, APs 106A-C can be managed and configured by the controller 104. APs 106A-C communicate with the controller 104 and the network over connections 112, which may be either wired or wireless interfaces.

The network 120 may be a public or private network, such as the Internet, or other communication network to allow connectivity between site 102 and, e.g., other sites (not shown) as well as access to servers, e.g., server 160. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

Additionally, network 120 may be further operatively/communicatively connected to a centralized IPM system 170. As alluded to above, such a centralized IPM system avoids the need for IPM modules to be integrated in those electronic devices to which power delivery is to be regulated, adapted, or otherwise managed. For example, centralized IPM system 170 may operate to provide IPM to electronic devices, e.g., APs 106A-C, vis-à-vis switch 108 or router 104. Centralized IPM system 170 may be embodied in/as a cloud server, cloud computing device, edge computing device, or other remotely-implemented system or function that can manage the power delivered to electronic devices under its purview or to which such electronic devices are operatively connected and controlled (at least from a power delivery perspective).

In operation, centralized IPM system 170 may obtain or receive power management profiles or information that can be used to make up a power management profile for APs 106A-C. Such power management profiles may include information indicative of the features or software functionalities provided or supported by one or more of APs 106A-C(as desired), including, but not necessarily limited to, e.g., the number of physical radios implemented in an AP, the number of virtual APs supported by an AP, the number of physical ports on an AP, etc. Additionally, such power management profiles may include information regarding the importance or priority of one or more features or combinations/feature sets of an AP, as well as power requirements or budgets for such features/feature sets.

Centralized IPM system 170 may also obtain/receive information indicative of the delivery of power from a power source, e.g., router 104 in this example. That is, centralized IPM system 170 may receive information indicating that the current/default/original total power budget of router 104 (delivering power via PoE) has changed for some reason. Perhaps due to some load balancing mechanism to which router 104 is subject, router 104 is now providing a portion of its original power budget to additional network devices, i.e., its total power budget for router 104 has been reduced.

Based on these sets of information, centralized IPM system 170 may determine what number of features, and/or which features should be provided/not provided/prioritized/ etc., as well as other relevant considerations (to the extent they exist) in accordance with the reduced power budget. Centralized IPM system 170 may then transmit a configuration for an AP(s) commensurate with its corresponding feature/feature set determination. In this way, upon receipt of its new or changed/updated configuration, an AP can alter its configuration to correspond to the feature/feature set determined by centralized IPM system 170, and thus adapt to a new/altered power budget, without having a dedicated IPM module integrated therein.

Figure 1B:
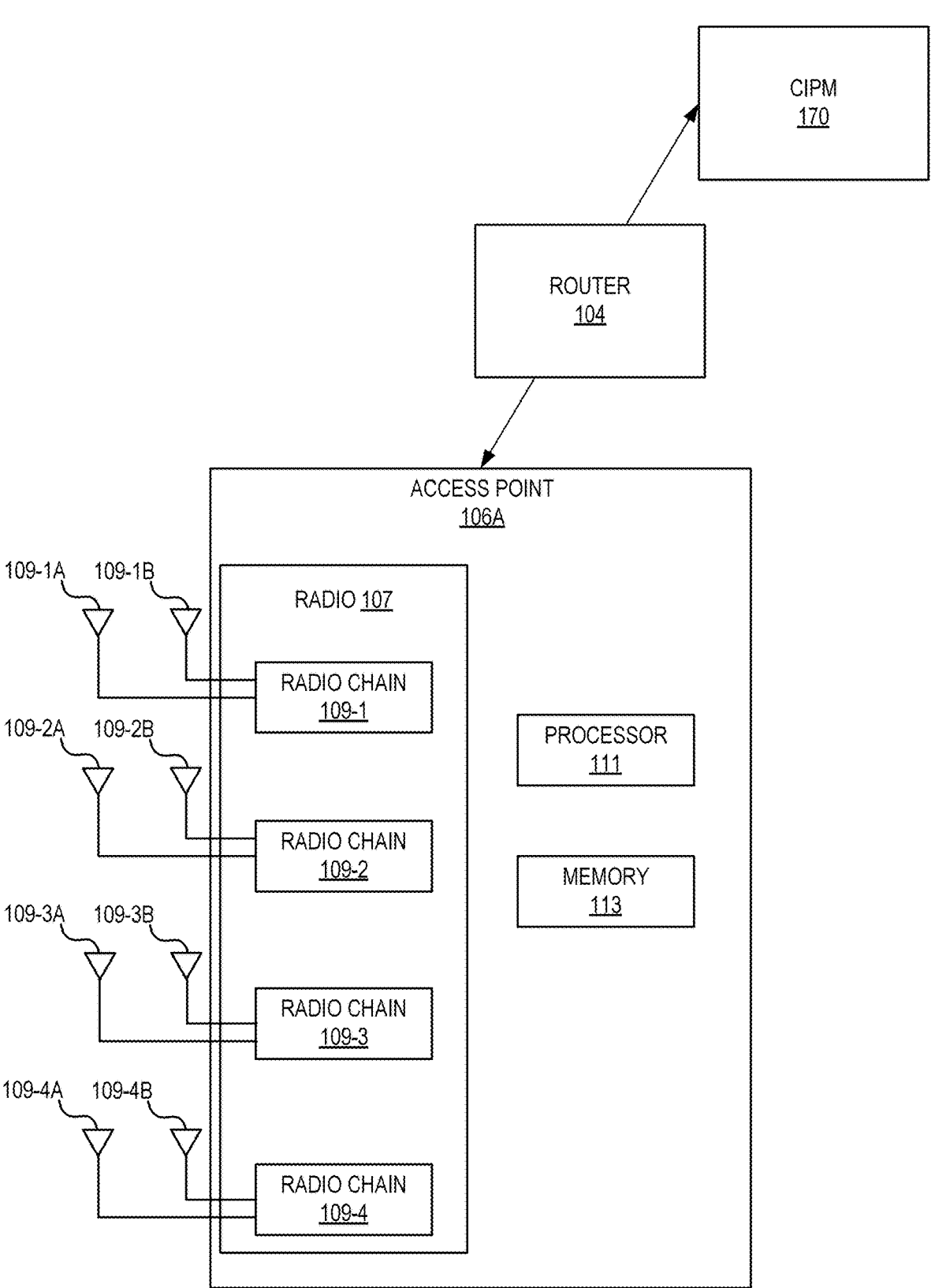
FIG. 1B illustrates an access point whose power budget has been intelligently managed in accordance with one example of the disclosed technology.

FIG. 1B illustrates an example AP, which may be an embodiment of one of the APs of FIG. 1 (in this example, AP 106A). An AP can refer to a networking device that allows a wireless client device to connect to a wired or wireless network, and need not necessarily be limited to IEEE 802.11-based APs. An AP can include a processing resource, e.g., processor 111, a memory, e.g., memory 113, and/or input/output interfaces (not shown), including wired network interfaces such as IEEE 802.3 Ethernet interfaces, as well as wireless network interfaces such as IEEE 802.11 Wi-Fi interfaces, although examples of the disclosure are not limited to such interfaces.

AP 106A can include a plurality of antennas. AP 106A can include a radio 107 including four radio chains, 109-1. 109-2, 109-3, and 109-4, where each radio chain includes two antennas (109-1A, 109-1B. 109-2A, 109-2B, 109-3A, 109-3B, 109-4A, 109-4B). For instance, each radio chain can include a horizontal antenna and a vertical antenna, among other possibilities. As shown in FIG. 1B, AP 106A can be a 4×4 multiple-inputs, multiple-outputs (MIMO) AP. Here, a 4×4 MIMO AP may have four radio chains (109-1, 109-2, 109-3, 109-4) with each radio chain available for both transmitting and receiving data. It should be understood that examples of the present disclosure are not so limited. For example, AP 106A can be a MIMO network device with smaller than a 4×4 antenna and radio chain configuration, or a MIMO network device with greater than a 4×4 antenna and radio chain configuration.

Although not shown in FIG. 1B for clarity and so as not to obscure examples of the present disclosure, each of the radio chains can be connected to the plurality of antennas 109-1A to 109-4B via a RF switch. In some examples, a first portion of the plurality of radio chains (e.g., radio chain 109-3 and 109-4) can be dedicated to a first communication channel, and a second portion of the plurality of radio chains (e.g., 109-1 and 109-2) can be dedicated to another communication channel.

As alluded to above, depending on a network device's power management profile, one or more of its features or resources (whether software, hardware, or some combination thereof) may be selected to be enabled or disabled, or otherwise altered in operation, such as a feature with reduced functionality, in accordance with a power budget change. Following the above example, centralized IPM system 170, upon receiving power delivery information from router 104 may, over some time detect a change in the power budget of router 104. In accordance with that change in power budget, centralized IPM system 170 may analyze AP 106A's corresponding power management profile to determine what feature/feature set to enable or disable so that AP 106A may still operate in some capacity while being provided its new/altered power budget. For example, as illustrated in FIG. 1B, centralized IPM system 170 may determine that given the amount of power budget reduction at router 104, AP 106 cannot operate two of its radio chains. AP 106A's power management profile may indicate that radio chains 109-1 and 109-2, support a 5G channel necessitating greater RF power output from antennas 109-1A-109-2B. In this case, centralized IPM system 170 may generate a new configuration or an update to AP 106A's current configuration such that radio chains 109-1 and 109-2 are turned off or otherwise disabled from being utilized.

Figure 2A:
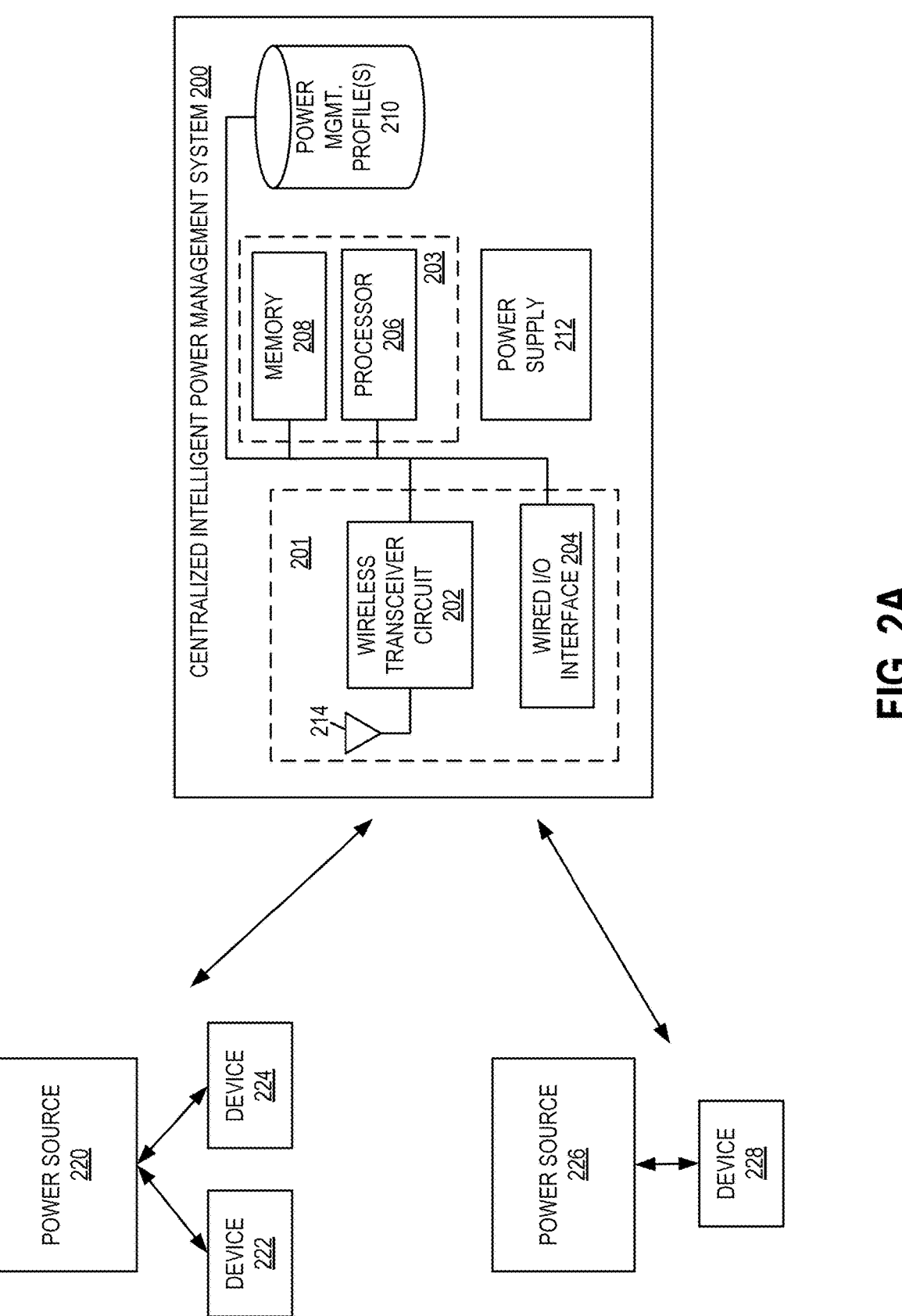
FIG. 2A illustrates a schematic representation of a centralized IPM system architecture in accordance with one example of the disclosed technology.

FIG. 2A is a schematic representation of a centralized IPM architecture in accordance with one example of the disclosed technology. Referring now to FIG. 2A, in this example, a centralized IPM architecture includes centralized IPM system 200, which may be an embodiment of centralized IPM system 170 of FIG. 1A. Centralized IPM system 200 may communicate wirelessly or over a wired connection to one or more network devices such as network power sources. As described above, examples of such network power sources may be network routers, switches, and the like. In the example of FIG. 2A, two power sources, power sources 220 and 226, are shown. Each of power sources 220 and 226 may provide power to one or more network devices, such as APs, e.g., network devices 222 and 224 (operatively connected to/receiving power from power source 220), and network device 228 (operatively connected to/receiving power from power source 226). It should be noted that centralized IPM system 200 may be implemented as a standalone system/network component, or it may be implemented as part of another, existing network system/component. Centralized IPM system 200 may communicate with one or more power sources, in this example, as noted, above, power sources 220 and 226. As described with respect to FIG. 1A, centralized IPM system 200 may communicate with such power sources via a network/within a network. As has already been described herein, centralized IPM system 200 may obtain power delivery information regarding power sources 220 and 226, as well as power management profiles associated with network devices 222, 224, and 228. Depending on the power budget and the power delivery information regarding power sources 220 and 226, features/feature sets associated with network devices 222, 224, and 228 can be enabled/disabled or otherwise operationally altered so that network devices 222, 224, and 228 may still provide some feature(s)/functionality in accordance with the power budget of power sources 220 and 226, respectively.

Processor 206 can include a GPU, CPU, microprocessor, or any other suitable processing system. The memory 208 may include one or more various forms of memory or data storage (e.g., flash, RAM, etc.) that may be used to store instructions for causing processor 206 to perform operations/make decisions or determinations regarding an appropriate configuration for a network device in accordance with a network power source power budget. Memory 208, can be made up of one or more modules of one or more different types of memory, and may be configured to store data and other information as well as operational instructions that may be used by the processor 206 to effectuate centralized IPM. Accordingly, processor 206 and memory 208 may comprise a decision circuit 203. Although the example of FIG. 2A is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up centralized IPM system 200.

Communication circuit 201, for communicating with power sources 220/228 and with network devices 222, 224, and 228, may be either or both a wireless transceiver circuit 202 with an associated antenna 214 and a wired I/O interface 204 with an associated hardwired data port (not illustrated). Typically, centralized IPM system 200 is able to communicate directly with network devices when sending device configurations. As this example illustrates, communications with centralized IPM system 200 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by centralized IPM system 200 to/from other network entities/devices.

Wired I/O interface 204 can include a transmitter and a receiver (not shown) for hardwired communications with other devices. For example, wired I/O interface 204 can provide a hardwired interface to other components, including ports, for example. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Figure 2B:
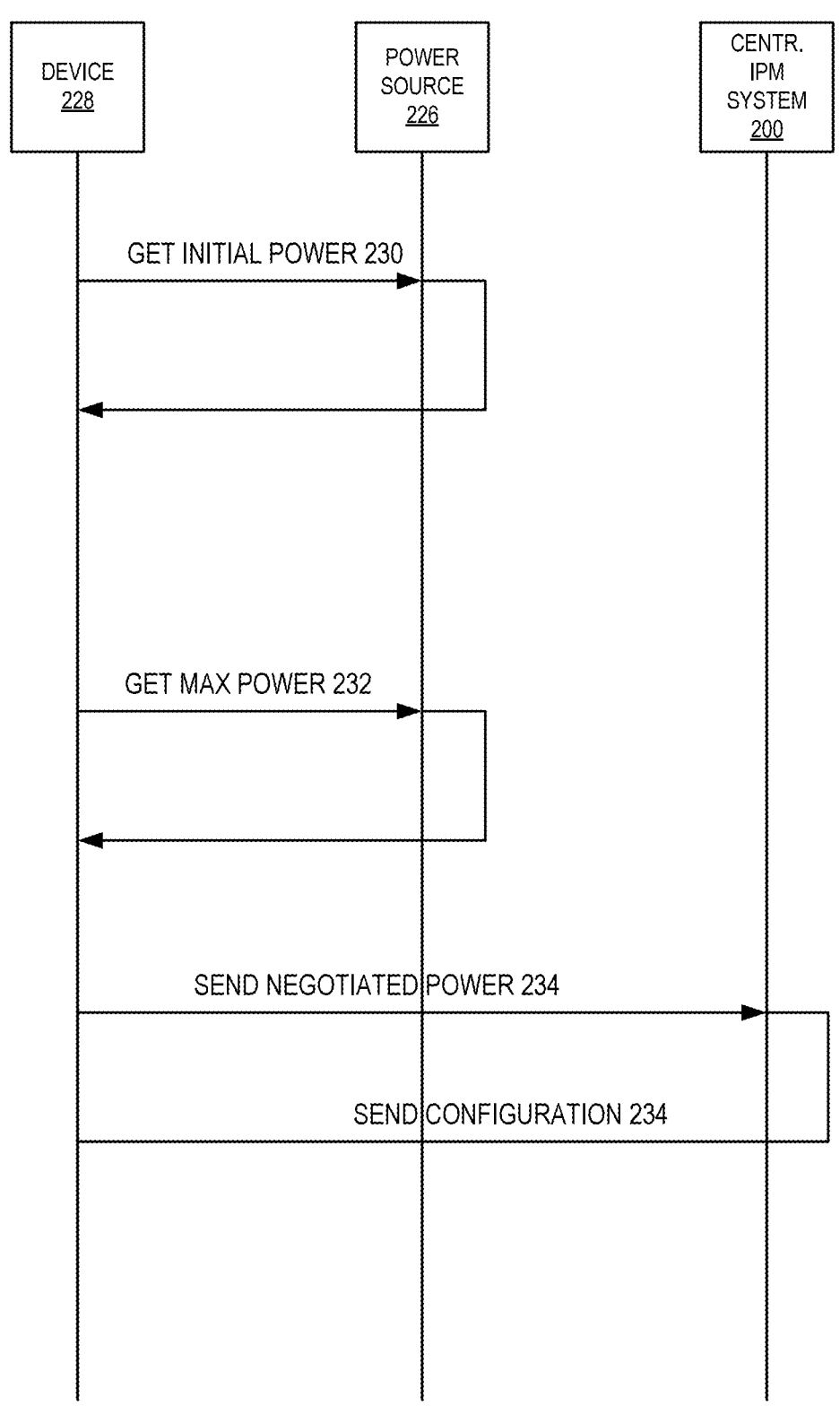
FIG. 2B is an operational flow diagram illustrating operations performed to effectuate centralized IPM in accordance with one example of the disclosed technology.

FIG. 2B is an operational flow chart illustrating operations performed to effectuate centralized IPM in accordance with one example of the disclosed technology. As already discussed above, centralized IPM can be achieved by virtue of a centralized IPM system that negates the need for IPM modules or components to be integrated into network devices that are to be powered by a network power source. Here, FIG. 2B illustrates example operations, collectively referred to as classification, for determining (by the power source), whether a connected device requires PoE, and if so, what PoE class is required by the connected device. Classification can be, e.g., a 2-event form/type of classification. In the example of FIG. 2B, power source 226 and device 228 may engage in a "GET INITIAL POWER" operation 230. That is, power source 226 may send a voltage impulse to device 228, and read a current voltage on the line connecting power source 226 and device 228. Power source 226 may check what PoE class the current voltage corresponds to, and power source 226 provides that corresponding level of power (up to Class 3 level power) to power/power up device 228. Power device 226 and device 228 may engage in a "GET MAX POWER" operation 232, e.g., device 228 may send a message to power source 226 that it is device to receive power, along with its maximum power, and the maximum power requested. Power source 226 can respond to device 228 indicating it is a power source, and that the maximum allowed power is some given amount. Device 228 may then be provided the amount of power (up to its maximum) as specified by power source 226. If the current voltage value corresponds to Class 4 power, power source 226 may use a second classification event to verify that Class 4 level power should actually be provided to device 228. That is, sending of the voltage impulse can be repeated, and if the voltage value still corresponds to Class 4, power source 226 provides Class 4 level power to device 228. In other words, if Class 4 level power is verified/confirmed by the second classification (hence, 2-event classification), power source 226 will deliver Class 4 level power to device 228, for hardware-based classification. For software-based classification, after power source 226 first performs the above-described 1-event classification, if a Class 4 power-commensurate value is read, power source 226 only provides Class 3 power, but to confirm, power source 2267 requests confirmation from device 228 via the Layer 2 LLDP protocol regarding whether or not device 228 is indeed, a Class 4 power type of device. If confirmed, power source 226 may provide that Class 4 level power to device 226. Once power has been negotiated, that negotiated power can be sent or forwarded to centralized IPM system 200, and as described herein, centralized IPM system 200 can analyze device 228's negotiated power relative to its power management profile (previously described). Upon determining an appropriate feature/feature set for device 228, in light of centralized IPM system 200's maximum power.

FIG. 3 is an example computing component 300 that may be used to implement centralized IPM in accordance with an example of the disclosed technology. Computing component 300 may be integrated in/as a remote or cloud-based server or system, such as centralized IPM system 170 or in/as part of server 160 of network architecture 100 (FIG. 1A). The computing component 300 may be, for example, a server computer, a controller, or any other similar computing component capable of processing data. In the example implementation of FIG. 3, the computing component 300 includes a hardware processor 302 and machine-readable storage medium 304. In some examples, computing component 300 may be an embodiment of processor 206 of centralized IMP system 200 of FIG. 2A.

Hardware processor 302 may be one or more central processing units (CPUs), semiconductor-based microprocessors, and/or other hardware devices suitable for retrieval and execution of instructions stored in machine-readable storage medium 304. Hardware processor 302 may fetch, decode, and execute instructions, such as instructions 306-312, to control processes or operations for performing centralized IPM. As an alternative to or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 604 may be a non-transitory storage medium, where the term "non-transitory" does not encompass transitory propagating signals. As described in detail below, machine-readable storage medium 304 may be encoded with executable instructions, for example, instructions 306-312.

Hardware processor 302 may execute instruction 306 to receive a negotiated power budget for a device connected to a power source. As discussed above, devices, such as network devices may receive power from a fixed-power budget power source, such as a switch, router, etc. Because such power sources are fixed-capacity power sources, scenarios can arise, where the power source may not be able to fulfill the entirety of a network device's specific power budget. For example, power requirements for a particular feature/feature set provided by or supported by a network device, such as an AP, may change. The manufacturer of the AP may distribute a new/updated power management profile for that model/type of AP. Upon receipt of such a power management profile, the power source may receive or obtain the device's negotiated power budget from the network device, e.g., as discussed previously with respect to FIG. 2B.

Hardware processor 302 may execute instruction 308 to analyze the power management profile of the device relative to the negotiated power budget. That is, a comparison can be made between the negotiated power budget and the (updated) power management profile of the device. As previously discussed, the power management profile of a device may include, e.g., a dataset or matrix of information characterizing the power requirements of each feature that can be supported by that device. Using one of the aforementioned algorithms (or other appropriate algorithms), a determination can be made as to which of the supported features the device can still support given its new/updated, per-feature power requirements in light of the device's negotiated power budget with its power source. For example, certain features' power requirements may increase while that of others may decrease, where the features whose power requirements increased are higher priority that those whose power needs have decreased. It should be understood that such determinations, and the manner(s) in which such determinations may be made, can be as simple as the use of a priority-assigned type of algorithm, or as complicated as may be desired. Various factors/considerations may be taken into account by an algorithm(s) or mechanism(s), e.g., certain AP radio chains may be favored in certain geographical locations, certain types of traffic may be allowed/disallowed from transmission/reception, and so on.

Accordingly, to the above, a decision can be made by hardware processor 302, i.e., hardware processor 302 may execute instruction 310, to select a desired feature set of services from the power management profile to be provided by the device commensurate with the negotiated power budget supplied by the power source. Again, various factors/ considerations may be taken into account to determination how such a selection is to be made. Priority, power requirements, geography, and so on, can play a part in the selection of an appropriate feature set of services based on the power capabilities of a power source.

Hardware processor 302 may execute instruction 312 to transmit a configuration comprising the desired feature set of services to the device. As discussed previously, the centralized IPM system disclosed herein can determine a feature set to support based on a device's power management profile and the negotiated power budget (the power capacity/capability of the power source for that device). When such a determination is made, that configuration of features can be transmitted to the device so the device may configure/reconfigure its services to comport with the configuration of features it received. That is, according to the received configuration, certain features may be enabled or disabled so that the configured features/services can be supported with the negotiated power budget.

In this way, power can be provided to the device in an amount that satisfies power requirements of the desired feature set of services. That is, because the centralized IPM system determines a device's feature set relative to its own total or otherwise available power budget and the negotiated power budget between the power source and the device, the configuration provided to the device is satisfiable by the power source.

It should be noted that although examples of the disclosed technology have been described in the context of devices, such as network devices, that do not have an integrated or dedicated IPM module, centralized IPM can still be utilized in systems or networks where devices do have an IPM module. Determinations in accordance with centralized IPM can be used to verify or check per-device IPM module determinations or vice-versa. In other examples, centralized IPM and dedicated IPM determinations or functions can be used to supplement one another.

Moreover, examples of the disclosed technology can be used to provide better visibility over the power usage of various devices, network-wide. With conventional dedicated IPM determinations, devices negotiate/determine their own power budgets in a vacuum, i.e., without knowledge of other power budgets to which the power source may be subject. Data or information obtained and used for analysis by a centralized IPM system can be used to augment power management profile determinations. For example, over time, a centralized IPM system may observe that particular devices experience heightened power requirements due to certain service/feature utilization at certain times. A network configuration entity, e.g., administrator, network topology tool, etc., may then be used as feedback for device power management profiles so that such profiles can be adapted to de-prioritize certain services outside those times of heightened use, for example.

Further still, because centralized IPM as disclosed herein can, in some examples, effectuate power management based on comparing power management profile information and monitored power usage/power budgets in, e.g., real-time/semi-real-time, there is no need for software upgrades/updates to adjust power management profiles or adjust a decision algorithm. In other words, with a centralized IPM, power management, as described on the negotiated power source, can be managed without a need to change the device's software if a new algorithm regarding device configuration or a feature update the negotiated power source comes into existence. That is, only the centralized IPM system is changed/upgraded, no service impact on the networks device. Versus other devices where the device configuration/feature from the negotiation power source is done on the device software, if there is change to the device configuration/feature there is a need for software upgrade for implementing the new algorithm, thus service impact are expected when the device will be upgraded.

Figure 4:
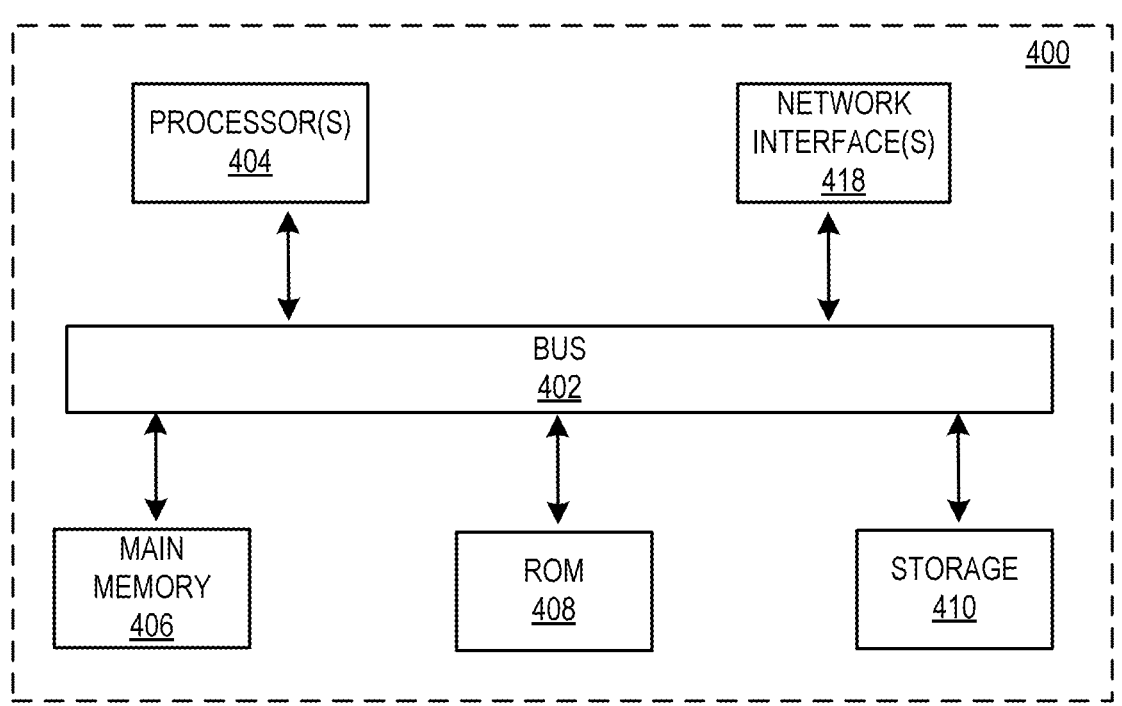
FIG. 4 is an example computing component that may be used to implement various features of embodiments described in the present disclosure.

FIG. 4 depicts a block diagram of an example computer system 400 in which various of the examples described herein may be implemented, including but not limited to processor 206, and computing component 300. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), is provided and coupled to bus 402 for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication/network interface 418 coupled to bus 402. Communication interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media. The computer system 400 can send messages and receive data, including program code, through the network(s), network link and communication interface 418.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   receiving, by a power management system, a negotiated power budget for a device connected to a power source;
   analyzing, by the power management system, a power management profile of the device relative to the negotiated power budget for the device, wherein the power management profile comprises at least information identifying services supported by the device and corresponding power requirement information;
   selecting, by the power management system, a desired feature set of services from the power management profile to be provided by the device commensurate with the negotiated power budget supplied by the power source;
   transmitting, from the power management system, a configuration comprising the desired feature set of services to the device; and
   providing, from the power source, power to the device in an amount that satisfies power requirements of the desired feature set of services.

2. The method of claim 1, wherein the power source and the device engage in a classification process to determine the negotiated power budget.

3. The method of claim 1, wherein the power management system comprises a centralized power source operatively connected to the device via a communications network.

4. The method of claim 3, wherein the power source comprises one of a network Power-over-Ethernet (POE) power source, Power-over-Wi-Fi (PoWiFi), or Power-over-fiber (PoF).

5. The method of claim 4, wherein the power source has a fixed total power budget used to provide power to the device and a plurality of additional devices operative on the communications network.

6. The method of claim 1, wherein the device comprises a network device.

7. The method of claim 1, wherein the power management profile further comprises priorities associated with one or more features.

8. The method of claim 1, wherein the feature set of services comprises a subset of the services supported by the device.

9. The method of claim 1, further comprising receiving the power management profile from a manufacturer or distributor of the device prior to receiving the negotiated power budget.

10. The method of claim 9, further comprising repeating performance of the operations of claim 1 upon receipt of an updated power management profile from the manufacturer or the distributor of the device.

11. The method of claim 1, wherein the selecting of the desired feature set of services is performed pursuant to an algorithm designed to prioritize receipt of power from the power source based on at least one characteristic of the services making up the desired feature set of services.

12. A system, comprising:
   a processor; and
   a memory operatively connected to the processor, and including computer code that when executed causes the processor to:
      analyze a power management profile of a device connected to the system and adapted to receive power from the system, wherein the power management profile comprises at least information identifying services supported by the device and corresponding power requirement information;
      based on monitored delivery of power from a power source, and the power management profile of the device, select a desired set of services from the power management profile to be provided by the device; and
      transmit information identifying the desired set of services to the device such that delivery of power from the power source to the device occurs at a level sufficient to support power requirements of the desired set of services.

13. The system of claim 12 comprising a centralized intelligent power management (IPM) system operatively connected to the device and to the power source via a communications network.

14. The system of claim 13, wherein the power source comprises a network power over Ethernet (POE) power source.

15. The system of claim 12, wherein the computer code that causes the processor to select the desired set of services further causes the processor to execute an algorithm designed to prioritize receipt of power from the power source based on at least one characteristic of services making up the desired set of services.

16. The system of claim 12, wherein the power source comprises one of a network switch or a network router.

17. The system of claim 16, wherein the device comprises an access point.

18. A method, comprising:
   a centralized intelligent power management (IPM) system negotiating with a network device to determine a power budget for the network device;

the centralized IPM system determining services supported by the network device;

the centralized IPM system comparing the power budget of a network power source to provide power to the network device to power requirements of the services supported by the network device;

the centralized IPM system determining a subset of the services supported by the network device that the network power source is able to power while remaining within the power budget of the network power source;

the centralized IPM system generating a configuration for the network device, the configuration comprising the subset of the services;

the centralized IPM system transmitting the configuration to the network device to facilitate providing, from the network power source, power to the network device in an amount that satisfies power requirements of the subset of the services.

19. The method of claim 18, wherein the centralized IPM system repeats performance of the negotiating, the determining of services, the comparing of the power budget to the power requirements, the generating of the configuration, and the transmitting of the configuration for at least an additional network device such that the centralized IPM systems supports power requirements of the subset of services of the network device and the at least additional network device while remaining within the power budget of the centralized IPM system.

20. The method of claim 18, wherein the network power source comprises one of a network Power-over-Ethernet (POE) source, Power-over-Wi-Fi (PoWiFi) source, or Power-over-fiber (PoF) source.

* * * * *